United States Patent
Camenisch et al.

(10) Patent No.: US 10,104,088 B2
(45) Date of Patent: Oct. 16, 2018

(54) TRAITOR TRACING FOR OBFUSCATED CREDENTIALS

(71) Applicant: International Business Machines Corporation, Armonk, NY (US)

(72) Inventors: Jan L. Camenisch, Thalwil (CH); Robert R. Enderlein, Adliswil (CH); Anja Lehmann, Zürich (CH); Gregory Neven, Oberrieden (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 185 days.

(21) Appl. No.: 15/278,411

(22) Filed: Sep. 28, 2016

(65) Prior Publication Data

US 2018/0091520 A1    Mar. 29, 2018

(51) Int. Cl.
*G06F 3/00* (2006.01)
*H04L 29/06* (2006.01)
(Continued)

(52) U.S. Cl.
CPC .......... *H04L 63/102* (2013.01); *H04L 9/0891* (2013.01); *H04L 9/3271* (2013.01); *H04L 2463/146* (2013.01)

(58) Field of Classification Search
CPC ............. H04L 2463/146; H04L 63/102; H04L 9/0891; H04L 9/3271
See application file for complete search history.

(56) References Cited

U.S. PATENT DOCUMENTS

| 5,633,929 A | * | 5/1997 | Kaliski, Jr. | .......... H04L 9/0894 380/28 |
| 7,010,125 B2 | | 3/2006 | Lotspiech et al. | |

(Continued)

FOREIGN PATENT DOCUMENTS

WO    2013004691 A1    1/2013

OTHER PUBLICATIONS

Masayuki Abe et al. "Provably Secure Fair Blind Signatures with Tight Revocation," Advances in Cryptology—ASIACRYPT 2001; Springer Berlin Heidelberg, 2001, pp. 583-601.

(Continued)

*Primary Examiner* — Joseph P Hirl
*Assistant Examiner* — Sayed Beheshti Shirazi
(74) *Attorney, Agent, or Firm* — Cantor Colburn LLP; David Quinn (57) ABSTRACT

A method, computer program product, and system for providing verification processes associated with a commitment-based authentication protocol are described. A request by a user for access to one or more resources is received, and a presentation policy is transmitted to the user indicating required credentials. A commitment to a revocation handle is received, including an indication of an associated Sigma protocol executed by the user. A challenge value selected from a challenge value set associated with the associated Sigma protocol is transmitted to the user. Based on the selected challenge value, a presentation token and a value parameter that is distinct from the presentation token are received from the user. Based on a determination as to whether the presentation token and value parameter are valid in accordance with the associated Sigma protocol, access for the user to the one or more resources is granted to the user or prevented.

15 Claims, 3 Drawing Sheets

(51) Int. Cl.
*H04L 9/32* (2006.01)
*H04L 9/08* (2006.01)

(56) References Cited

U.S. PATENT DOCUMENTS

| | | | |
|---|---|---|---|
| 7,308,707 | B2 | 12/2007 | Harrison et al. |
| 7,505,593 | B2 | 3/2009 | Jin et al. |
| 7,876,895 | B2 | 1/2011 | Jin et al. |
| 8,121,287 | B2 | 2/2012 | Jin et al. |
| 8,200,977 | B2 | 6/2012 | Yoshida et al. |
| 8,433,897 | B2 | 4/2013 | Yoshida et al. |
| 8,495,362 | B2 | 7/2013 | Furukawa |
| 8,683,209 | B2 | 3/2014 | Li et al. |
| 8,738,539 | B2* | 5/2014 | Al-Herz .............. H04L 9/321 705/24 |
| 9,906,512 | B2* | 2/2018 | Camenisch .......... H04L 9/3268 |
| 2007/0101138 | A1* | 5/2007 | Camenisch .......... H04L 9/3234 713/168 |
| 2007/0294183 | A1* | 12/2007 | Camenisch ............ G06Q 20/06 705/65 |
| 2008/0177998 | A1 | 7/2008 | Apsangi et al. |
| 2012/0144459 | A1* | 6/2012 | Nguyen ............... H04L 9/0891 726/5 |
| 2014/0013116 | A1 | 1/2014 | Smith et al. |
| 2014/0281525 | A1* | 9/2014 | Acar .................... H04L 9/3213 713/168 |
| 2015/0081566 | A1* | 3/2015 | Slepinin ............ G06Q 20/3829 705/69 |
| 2017/0033934 | A1* | 2/2017 | Camenisch .......... H04L 9/3263 |
| 2017/0141925 | A1* | 5/2017 | Camenisch .......... H04L 9/3249 |
| 2017/0163421 | A1* | 6/2017 | Chase .................. H04L 9/3066 |

OTHER PUBLICATIONS

Tolga Acar et al.; "Accumulators and U-Prove Revocation"; Intel Corporation, Department of Information Engineering, Chinese University of Hong Kong; 2013, 8 pages.

Man Ho Au et al.; "Constant-Size Dynamic k-TAA"; Center for Information Security Research, School of Information Technology and Computer Science, Sep. 2006, 18 pages.

Mihir Bellare et al.; "GQ and Schnorr Identification Schemes: Proofs of Security against Impersonation under Active Concurrent Attacks"; CRYPTO 2002, LNCS 2442, 2002, pp. 162-177.

Patrik Bichsel et al. D2.2—Architecture for Attribute-based Credential Technologies—Final version. ABC4Trust Deliverable D2.2, 2014, Goethe University Frankfurt, IBM Research—Zurich, Microsoft NV, 149 pages.

Brands; "Rethinking Public Key Infrastructures and Digital Certificates"; The MIT Press; 2000; 338 pages.

Jan Camenisch et al.; "A Signature Scheme with Efficient Protocols"; SCN 02, vol. 2576 of LNCS, 2002, 21 pages.

Jan Camenisch et al.; "Dynamic Accumulators and Application to Efficient Revocation of Anonymous Credentials"; CRYPTO 2002, vol. 2442 of LNCS, 2002, 15 pages.

Jan Camenisch et al.; "Signature Schemes and Anonymous Credentials from Bilinear Maps"; CRYPTO 2004, LNCS 3152, 2004, pp. 56-72.

David Chaum et al.; "Wallet Databases with Observers"; E.F. Brickell (Ed.): Advances in Cryptology—CRYPT0 '92, LNCS 740, 1993, pp. 89-105.

David Chaum; "Group Signatures"; Advances in Cryptology—EUROCRYPT '91, LNCS 547, 1991, pp. 257-265.

David Chaum; "Security Without Identification: Transaction Systems to Make Big Brother Obsolete"; Communications of the ACM, vol. 28, No. 10, Oct. 1985, pp. 1030-1044.

Benny Chor et al.; "Tracing Traitors"; Y.G. Desmedt (Ed.):Advances in Cryptology-CRYPTO '94, LNCS 839, 1994, pp. 257-270.

Robert R. Enderlein "Anonymous Access Control with Attribute-Based Encryption," Thesis is submitted in partial fulfillment of the requirements for the degree of Master of Science in Communication Systems at the Ecole Polytechnique Federale de Lausanne (EPFL) (2011), 65 pages.

Uriel Feige et al. "Zero-Knowledge Proofs of Identity," In Alfred Aho, editor, 19th ACM STOC, ACM Press, May 1987, pp. 210-217.

Jorn Lapon et al. "Analysis of revocation strategies for anonymous Idemix credentials." Communications and Multimedia Security; Springer Berlin Heidelberg, 2011, 15 pages.

Pryds Pedersen "Non-interactive and information-theoretic secure verifiable secret sharing," In Joan Feigenbaum, editor, CRYPTO'91, vol. 576 of LNCS, Springer, Aug. 1991, pp. 129-140.

Xiaoyu Ruan "Privacy at the Next Level: Intel's Enhanced Privacy Identification (EPID) Technology," Platform Embedded Security Technology Revealed; Apress, 2014, 30 pages.

C.P. Schnorr "Efficient Identification and Signatures for Smart Cards," G. Brassard, editor, Advances in Cryptology—CRYPTO'89, vol. 435 of LNCS, Springer, 1990, pp. 688-689.

Jesse Walker et al. "Key exchange with anonymous authentication using DAA-SIGMA protocol."; Trusted Systems; Springer Berlin Heidelberg, 2011; 19 pages.

* cited by examiner

TRAITOR TRACING FOR OBFUSCATED CREDENTIALS

BACKGROUND

This disclosure relates to cryptographic credentials and, more specifically, to tracing rogue cryptographic credentials while preserving privacy properties of an underlying authentication scheme of a computing system.

Credentials in cryptography establish the identity of a party to an electronic, computer-based communication. Cryptographic credentials usually take the form of machine-readable cryptographic keys and/or passwords, which can be self-issued, or issued by a trusted third party. In many contemporary cryptographic systems, the only criterion for issuance is unambiguous association of the credential with a specific, real individual or other entity.

SUMMARY

According to at least one embodiment, a method to provide verification processes associated with a commitment-based authentication protocol is implemented by one or more computing systems and comprises receiving a request by a user for access to one or more network-accessible resources; transmitting a presentation policy to the user indicating one or more credentials required for the requested access; receiving a commitment to a revocation handle, wherein receiving the commitment includes receiving an indication of a Sigma protocol associated with distinct instruction sets P1, P2, and V, and wherein the received commitment includes information indicative of an output of the instruction set P1; providing to the user a challenge value selected from a challenge value set associated with the indicated Sigma protocol; receiving, from the user and based at least in part on the selected challenge value and the indicated Sigma protocol, a presentation token and a value parameter that is distinct from the presentation token, wherein the value parameter is indicative of an output of instruction set P2; determining, based at least in part on verifying an output of the instruction set V, whether the presentation token and value parameter are valid in accordance with the indicated Sigma protocol; and granting access for the user to the one or more network-accessible resources if it is determined that the presentation token and value parameter are valid in accordance with the indicated Sigma protocol, otherwise preventing access to the one or more network-accessible resources by the user.

According to another embodiment, a method to provide verification processes associated with a commitment-based authentication protocol is implemented by one or more computing systems and comprises receiving a request by a user for access to one or more resources; transmitting a presentation policy to the user indicating one or more credentials required for the requested access; receiving a commitment to a revocation handle, wherein receiving the commitment includes receiving an indication of an associated Sigma protocol executed by the user; providing to the user a challenge value selected from a challenge value set associated with the associated Sigma protocol; receiving, from the user and based at least in part on the selected challenge value and the associated Sigma protocol, a presentation token and a value parameter that is distinct from the presentation token; and granting access for the user to the requested one or more resources if it is determined that the presentation token and value parameter are valid in accordance with the associated Sigma protocol, otherwise preventing access to the requested one or more resources by the user.

According to another embodiment, a non-transitory computer-readable storage medium has stored contents that, when executed, cause a computing system to perform a method that comprises receiving a request by a user for access to one or more resources; transmitting a presentation policy to the user indicating one or more credentials required for the requested access; receiving a commitment to a revocation handle, wherein receiving the commitment includes receiving an indication of an associated Sigma protocol executed by the user; providing to the user a challenge value selected from a challenge value set associated with the associated Sigma protocol; receiving, from the user and based at least in part on the selected challenge value and the associated Sigma protocol, a presentation token and a value parameter that is distinct from the presentation token; and granting access for the user to the requested one or more resources if it is determined that the presentation token and value parameter are valid in accordance with the associated Sigma protocol, otherwise preventing access to the requested one or more resources by the user.

According to another embodiment, a computing system comprises one or more processors and at least one memory that includes instructions that, upon execution by a processor, cause the computing system to perform a method that includes receiving a request by a user for access to one or more resources; transmitting a presentation policy to the user indicating one or more credentials required for the requested access; receiving a commitment to a revocation handle, wherein receiving the commitment includes receiving an indication of an associated Sigma protocol executed by the user; providing to the user a challenge value selected from a challenge value set associated with the associated Sigma protocol; receiving, from the user and based at least in part on the selected challenge value and the associated Sigma protocol, a presentation token and a value parameter that is distinct from the presentation token; and granting access for the user to the requested one or more resources if it is determined that the presentation token and value parameter are valid in accordance with the associated Sigma protocol, otherwise preventing access to the requested one or more resources by the user.

According to another embodiment, a non-transitory computer-readable storage medium has stored contents that, when executed, cause a computing system to perform a method that comprises transmitting a presentation policy indicating one or more credentials required for obtaining access to one or more resources; receiving a commitment to a revocation handle, wherein the commitment includes an indication of a Sigma protocol; providing a challenge value selected in accordance with the indicated Sigma protocol; receiving, based at least in part on the selected challenge value and the indicated Sigma protocol, a presentation token and a value parameter; and granting access to the requested one or more resources only if the presentation token and value parameter are validated in accordance with the indicated Sigma protocol.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

Privacy-preserving Attribute-Based Credentials or Privacy-ABCs, sometimes also known as anonymous credentials or minimal disclosure tokens, allow users to authenticate to verifiers in a privacy-preserving manner. Issuers assign attributes to users by issuing credentials containing the list of attributes for that user. Users can then use this credential to convince a verifier that his attributes satisfy certain properties, but without disclosing more information than strictly necessary and without being linkable between different presentations. The verifier specifies which attributes must be disclosed or which predicates (e.g., equality or inequality) the attributes must fulfill in a presentation policy. Users derive from their credentials a presentation token that provides cryptographic evidence of the disclosed attribute values and that the predicates are satisfied. The verifier can check the validity of the presentation token using the issuer's public key.

Typically, Privacy-ABC schemes are based on signature schemes with efficient zero-knowledge proofs. They allow the issuer to create a signature on a list of attributes and allow the user to later prove knowledge of a valid signature while revealing only a subset of the attributes, or even only the mere fact that a certain predicate over the attributes holds.

In a large-scale deployment of any type of authentication, it is crucial that one can efficiently revoke credentials that have been lost or compromised. Due to the privacy features of Privacy-ABCs, revocation is slightly more complicated than for standard public-key infrastructures. For example, a credential may need to be revoked when a rogue credential has been detected. Often, it is assumed that the compromised credential can be extracted from any code or device that uses it. This assumption is incorrect, however, when code obfuscation has occurred. Code obfuscation is a tool that renders executable software code "unintelligible," in the sense that the internal structure and data of the code can no longer be inspected, while preserving the functionality of the code.

Code obfuscation poses a threat to privacy-preserving authentication mechanisms because the adversary could embed a compromised credential (which could have been a software-only credential originally, or may have been extracted from a hardware device) into a piece of obfuscated code that performs valid presentations, but that does not leak any uniquely identifying information, thereby generating a mostly functional credential that cannot be traced.

This disclosure provides a presentation protocol for cryptographic credentials and, more specifically, for tracing rogue cryptographic credentials while preserving privacy properties of an underlying authentication scheme of a computing system. One or more embodiments described herein enable one or more processor-based computing systems to identify a revocation handle associated with a rogue credential even when the source of that rogue credential is deliberately obfuscated, such as in instances of obfuscated software or an obfuscated hardware device. By identifying a revocation handle, the rogue credential itself may also be uniquely identified. Thus, the described techniques may enable the prevention of access to rights-managed resources in situations that might otherwise require preventing such access by additional users not associated with the rogue credential.

Figure 1:
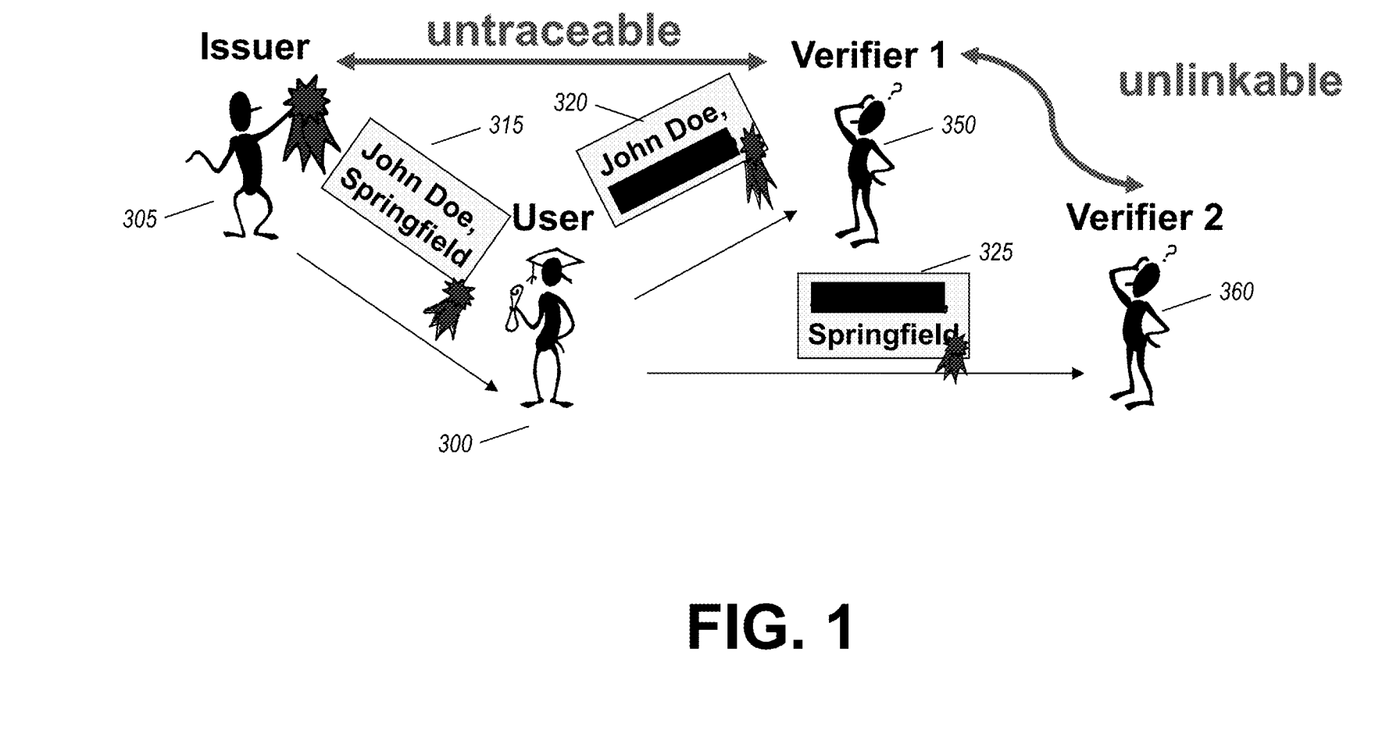
FIG. 1 depicts an exemplary scenario in which the techniques described herein may be utilized in accordance with an embodiment.

FIG. 1 depicts exemplary transactions between computing systems associated with various parties, in which untraceable but verifiable credentials may be utilized in accordance with certain embodiments of one or more techniques presented herein. It is understood that depictions of human entities within FIG. 1 symbolize particular computing systems respectively associated with those entities.

An end user, associated with computing system 300, wishes to present verifiable credentials to computing systems respectively associated with multiple verifying entities ("verifiers"), such as in order to gain access to particular network-accessible or other resources managed by those verifying entities. The end user wishes to present to each verifier only the information required by that verifier. Verifier 1, associated with computing system 350, requires a verified credential indicating a name for any user requesting access to the resources managed by Verifier 1. Verifier 2, associated with computing system 360, requires a verified credential indicating that a requesting user resides in one or more accepted locations (one of which is Springfield).

The end user presents, via computing system 300, information verifying his identity as John Doe of Springfield to a credential issuer associated with computing system 305. In response, the credential Issuer issues to the end user (via computing systems 305 and 300) credentials 315, which separately indicate a name value of "John Doe" and a residence value of "Springfield."

In order to access the resources managed by Verifier 1, the user presents (via computing system 300) credential 320—which includes the verified name credential of "John Doe" but does not include the verified residence credential of "Springfield"—to the computing system 350 associated with Verifier 1. In a similar manner, in order to access the resources managed by Verifier 2, the user presents credential 325—which includes the verified residence credential of "Springfield" but not the verified name credential of "John Doe"—to the computing system 360 associated with Verifier 2. Verifier 1 and Verifier 2 may each be assured that the credentials respectively presented by the user are valid, and yet such credentials are untraceable to the credential Issuer associated with computing system 305. Furthermore, Verifier 1 has no knowledge of the user's residence, and Verifier 2 has no knowledge of the user's name. Moreover, Verifier 1 and Verifier 2 are unaware that the user has presented the other party with any credential.

In furtherance of the interactions described above, consider a commitment scheme that allows one to commit to a chosen value or statement while keeping it hidden from others, with the ability to reveal the committed value later. Such commitment schemes are "binding," such that a party cannot change the value or statement after that party has committed to it.

As used herein, a commitment scheme CMT=(Cmt, Open) consists of a commitment instruction set that, on input of a message $m \in \{0, 1\}^*$, returns a tuple $(cmt, op) \leftarrow Cmt(m)$ consisting of a commitment cmt and opening information op. To open a commitment—i.e., to show that a given commitment cmt is a valid commitment to a given message m—one reveals m and op. One can verify the correctness of the commitment by running Open(cmt, m, op), which returns 1 if the opening is valid and 0 otherwise. In terms of security, the commitment scheme must be hiding in the sense that cmt does not leak any information about m, and binding in the sense that it is hard to come up with a commitment cmt, two different messages m/=m', and two openings op, op' such that Open(cmt, m, op)=Open(cmt, m', op')=1.

A commitment scheme with a Sigma protocol for the language consists of commitments, for which the witnesses are the messages and opening information:

R={(cmt, (m, op)):Open(cmt, m, op)=1}.

As used herein, $L \subseteq \{0, 1\}^*$ is a language with witness relationship R such that $x \in L \Leftrightarrow \exists w:(x, w) \in R$. A Sigma protocol associated to L with challenge value set C includes distinct instruction sets $P_1$, $P_2$, V that make up an interactive proof protocol as follows:

$P_1$ is run by the prover on input language element x and witness w. It outputs a value t and state information st. The prover sends t to the verifier.

The verifier chooses a random challenge value $c \leftarrow C$ and sends it to the prover.

The prover computes a response by running $s \leftarrow P_2(c, st)$ and sends it to the verifier.

The verifier accepts if and only if V(x, t, c, s)=1.

For security, two properties are required of a sigma protocol: "zero knowledge" and "special soundness." As used herein, "zero knowledge" indicates that there exists a simulator Sim such that for all $x \in L$, the output of Sim(x) is indistinguishable from a fresh transcript (t, c, s) generated via an honest interaction of $P_1$, $P_2$, V. Also as used herein, "special soundness" indicates that there exists an extractor E that, given two transcripts (t, c, s) and (t, c', s') such that V(x, t, c, s)=V(x, t, c', s')=1 and c/=c', computes a witness $w \leftarrow E(x, t, c, s, c', s')$ such that $(x, w) \in R$.

One example of a commitment scheme in accordance with the techniques described herein is a Pedersen commitment scheme. Here, G is a cyclic group of prime order p where the discrete logarithm problem is hard; g, $h \leftarrow G^*$ are two generators of G. To commit to a message $m \in Z_p$, $op \leftarrow Z_p$ is chosen and $cmt \leftarrow g^m h^{op}$ computed. To open a commitment, the verifier checks that $cmt = g^m h^{op}$. The associated Sigma protocol is as follows:

$P_1$(cmt, (m, op)): Choose $r_1, r_2 \leftarrow Z_p$, return $t \leftarrow g^{r_1} h^{r_2}$ and st=(m, op, $r_1$, $r_2$).

The verifier chooses $c \leftarrow Z_2 R$.

$P_2$(c, (m, op, $r_2$, $r_2$)): Return $s_1 \leftarrow cm+r_1$ mod p and $s_2 \leftarrow cop+r_2$ mod p.

V(cmt, t, c, ($s_1$, $s_2$)): If $g^{s_1} h^{s_2} = t \, cmt^c$ then return 1, else return 0.

To be able to revoke individual credentials in a Privacy-ABC system, the credentials must have some built-in unique identifier by which they can be revoked, but that for privacy reasons of course cannot be revealed during a presentation. Such identifier is referenced herein as revocation handle rh.

When a rogue piece of software or hardware device R is discovered that can perform valid presentations, the revocation handle rh must be extracted in order to determine which credential to revoke. In certain embodiments, at least because the code may have been obfuscated to hide all internal structure of the code, it may be desirable to do so with only "black-box access" to the rogue software, such that only input values and output results are accessible. Likewise, a rogue hardware device may be constructed in a tamperproof manner, making it impossible to reverse-engineer. In addition, due to privacy properties of Privacy-ABCs, presentation tokens do not leak any uniquely identifying information about the underlying credential.

A usual Privacy-ABC presentation is a three-move interaction, where the user first sends an access request to the verifier, the verifier sends back a policy describing which credentials are required and what information about them must be revealed, upon which the user creates a corresponding presentation token that it sends back to the verifier. To be able to trace rogue credentials, in at least one embodiment such interaction is extended with an execution of a Sigma protocol over a fresh commitment on the revocation handle. In addition, the underlying Privacy-ABC scheme must somehow be able to prove that the revocation handle in the commitment is the same as the revocation handle of the credential. For the Privacy-ABC schemes based on zero-knowledge proofs and the Pedersen commitment scheme described above, this can be done by encoding the revocation handle as an attribute in the credential and blending a proof of equal discrete logarithms into the main zero-knowledge proof. For Privacy-ABC schemes based on obfuscation, this may be accomplished by the obfuscated circuit checking that a commitment and opening information given as input indeed contain the revocation handle, such that the circuit signs the commitment.

In at least one embodiment, a modified presentation protocol in accordance with the techniques described herein is as follows:

1. The user requests access to a resource at the verifier.
2. The verifier sends a presentation policy to the user.
3. The user creates a commitment to the revocation handle rh that it will use for the presentation (cmt, op) $\leftarrow$ Cmt(rh), and performs the first round of the associated Sigma protocol (t, st) $\leftarrow P_1$(cmt, (rh, op)). The user sends cmt, t to the verifier.
4. The verifier chooses $c \leftarrow C$.
5. The user computes the second round of the Sigma protocol $s \leftarrow P_2(c, st)$ and invokes the presentation of the underlying Privacy-ABC scheme to generate a presentation token pt with the additional requirement to prove that the revocation handle in cmt is equal to the revocation handle in the credential used for the presentation. The user sends s, pt to the verifier.
6. The verifier checks that the presentation token is valid and checks that V(cmt, t, c, s)=1. If both tests succeed he accepts, otherwise he rejects.

If the user knows upfront which credential will be required for the presentation, then steps 1 and 3 can be merged, as well as steps 2 and 4. Note that by the zero-knowledge property of the Sigma protocol, the verifier cannot learn any information about the user's credential than what is revealed in the presentation token pt.

To be useful in this scenario, the rogue software R implements steps 3 and 5. The extractor of the Sigma protocol E is utilized to extract the revocation handle rh from R. In particular, have R perform step 3 to obtain cmt, t; provide a random $c \leftarrow C$; and have R perform step 5 to obtain s, pt from R. Subsequently, R is run again using the same random tape as during the first run. Step 3 outputs the same cmt, t as during the first run. A new $c' \leftarrow C$ is provided, and R then outputs s', pt'.

If both runs are successful in making the verifier accept, V(cmt, t, c, s)=V(cmt, t, c', s')=1. If in addition c/=c', the revocation handle may be extracted by computing (rh, op) $\leftarrow$ E(cmt, t, c, s, c', s'). If the rogue software R succeeds in making the verifier accept with probability suc, then the probability ext that extraction works is bounded by ext $\geq$ (suc$-1/|C|)^2$.

The first term suc on the right hand side is directly related to the usefulness of R as a rogue presentation device. The second term is determined by the size of the challenge value set C, which in many Sigma protocols (including the one for Pedersen commitments above) may be selected in any appropriate manner.

In at least certain embodiments, one can externally determine the entropy source of R, or at least force it to run twice on the same random coins. Typically with respect to rogue software, it is possible to re-run the same software beginning from a previous state. It is potentially more difficult for a tamperproof device, however, if it has its own entropy source on board. Techniques described herein may therefore be suitable for tracing rogue software.

Figure 2:
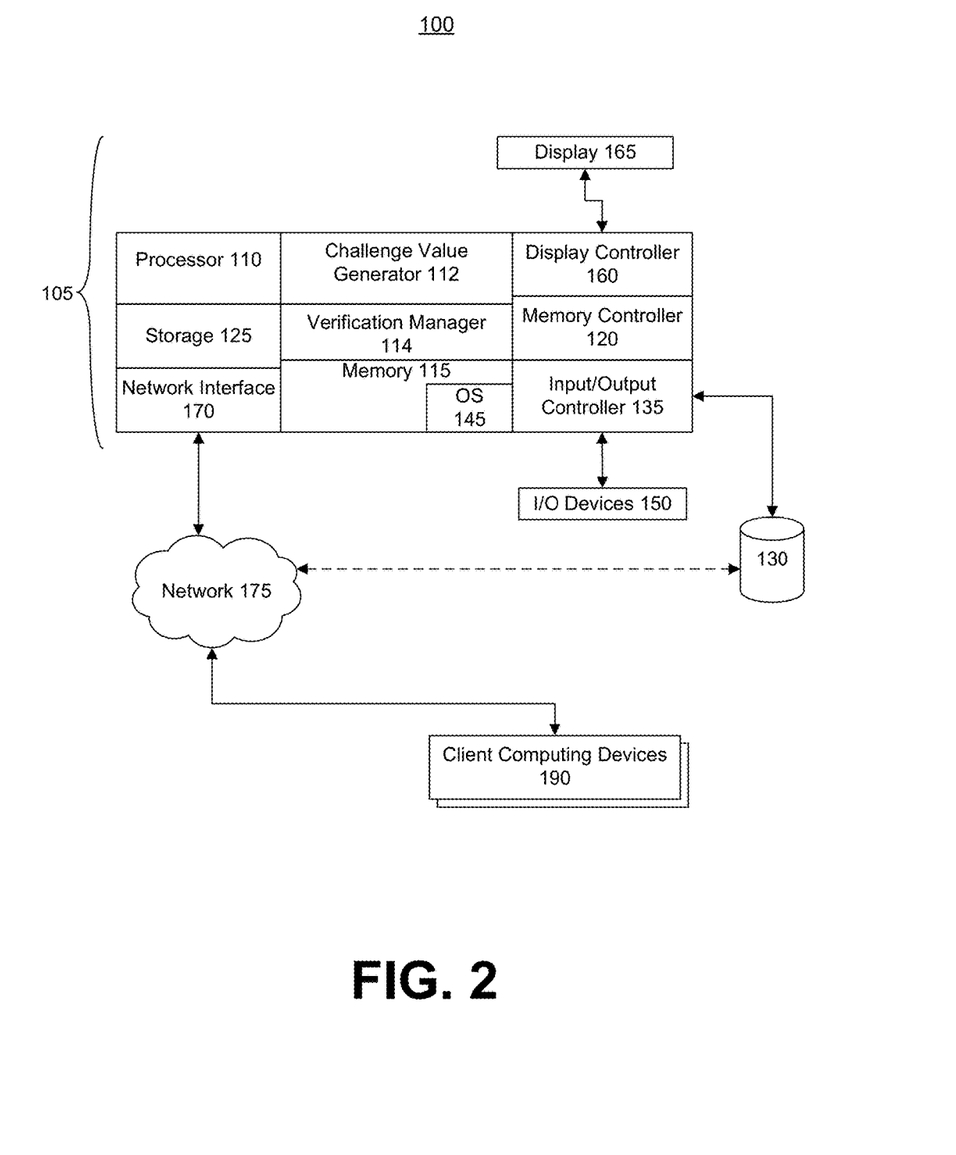
FIG. 2 depicts a block diagram of an exemplary network environment and computing system in accordance with an embodiment.

FIG. 2 illustrates a block diagram of a networked computing system 100 for use in practicing the teachings herein, such as for use as one or more of computing systems 300, 305, 350, and 360 in the illustrated embodiment of FIG. 1. The methods described herein can be performed or otherwise implemented via hardware, software (e.g., firmware), or combination thereof. In an exemplary embodiment, the methods described herein are implemented in hardware, and may be part of the microprocessor of a special or general-purpose digital computer, such as a personal computer, workstation, minicomputer, or mainframe computer. The computing system 100 therefore includes computer 105.

In the illustrated embodiment of FIG. 2, the computer 105 includes a processor 110, a challenge value generation module 112, a verification manager module 114, a memory 115 coupled to a memory controller 120, internal storage 125, and one or more input and/or output (I/O) devices 150 that are communicatively coupled to the computer 105 via a local input/output controller 135, which in the illustrated embodiment is further communicatively coupled to external storage 130. The input/output controller 135 may include one or more buses or other wired or wireless connections, as is known in the art. The input/output controller 135 may further include additional elements, which are omitted for simplicity, such as controllers, buffers (caches), drivers, repeaters, and receivers, to facilitate communications. Further, the local interface may include address, control, and/or data connections to facilitate appropriate communications among the aforementioned components.

Also in the illustrated embodiment, the processor 110 is a hardware device for executing hardware instructions or software, particularly that stored in memory 115. The processor 110 can be any custom made or commercially available processor, a central processing unit (CPU), an auxiliary processor among several processors associated with the general-purpose computer 105, a semiconductor based microprocessor (in the form of a microchip or chip set), a macroprocessor, or generally any device for executing instructions.

The memory 115 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 115 may incorporate electronic, magnetic, optical, and/or other types of storage media. Note that the memory 115 can have a distributed architecture, where various components are situated remote from one another, but can be accessed by the processor 110.

The instructions in the memory 115 may include one or more separate programs, each of which comprises an ordered listing of executable instructions for implementing logical functions. In the example of FIG. 2, the instructions in the memory 115 include a suitable operating system (OS) 145. The operating system 145 typically controls the execution of other computer programs and may, among other capabilities, provide scheduling, input-output control, file and data management, memory management, and communication control and related services.

In an exemplary embodiment, I/O devices 150 may include, as non-limiting examples, a keyboard, mouse, printer, scanner, microphone, a network interface card (NIC) or modulator/demodulator (for accessing other files, devices, systems, or a network), a radio frequency (RF) or other transceiver, a telephonic interface, a bridge, a router, and other peripherals communicatively coupled to the computer 105 via input/output controller 135. In the depicted embodiment, the computing system 100 further includes a display controller 160 coupled to a display 165, and a network interface 170 communicatively coupled to a network 175. The network 175 may be an IP-based network for communication between computer 105 and any external server, client and the like via a broadband or other network connection. The network 175 transmits and receives data between the computer 105 and external systems. In an exemplary embodiment, the network 175 may be a managed IP network administered by a service provider. The network 175 may be implemented in a wireless fashion, e.g., using wireless protocols and technologies, such as WiFi, WiMax, etc. The network 175 may also be a packet-switched network such as a local area network, wide area network, metropolitan area network, Internet network, or other similar type of network environment. The network 175 may be a fixed wireless network, a wireless local area network (LAN), a wireless wide area network (WAN) a personal area network (PAN), a virtual private network (VPN), intranet or other suitable network system and includes equipment for receiving and transmitting signals.

In at least some embodiments, the memory 115 may further include a basic input output system (BIOS) (omitted for simplicity). The BIOS is a set of routines that initialize and test hardware at startup, initiate execution of the OS 145, and support the transfer of data among the hardware devices. The BIOS is typically stored in ROM so that the BIOS may be executed when the computer 105 is activated. When the computer 105 is in operation, the processor 110 is configured to execute instructions stored within the memory 115, to communicate data to and from the memory 115, and to generally control operations of the computer 105 pursuant to the instructions.

Figure 3:
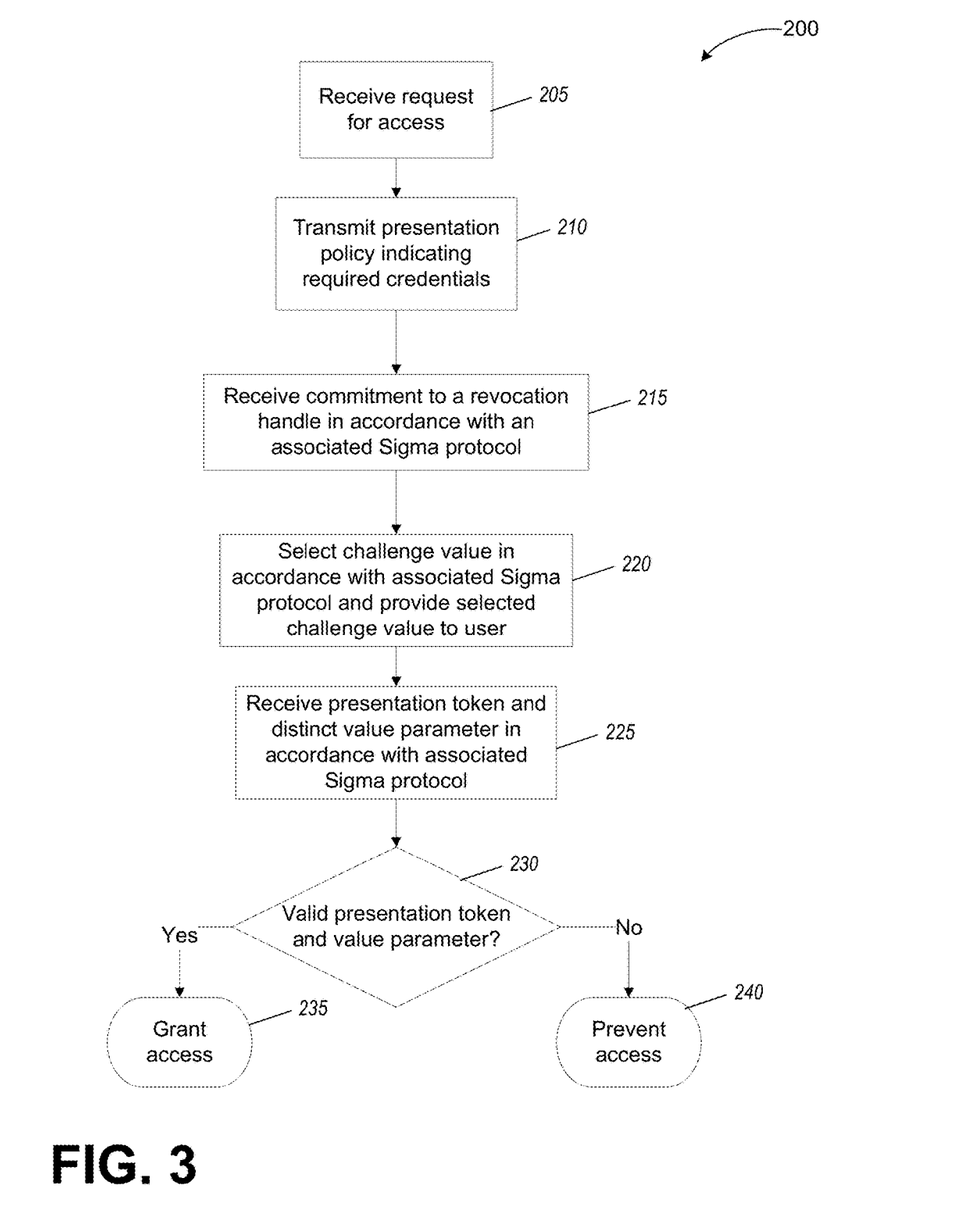
FIG. 3 depicts a process flow for providing access to rights-managed resources in accordance with an embodiment of techniques described herein.

FIG. 3 depicts a process flow for a routine providing access to rights-managed resources in accordance with an embodiment of techniques described herein. The depicted routine might be executed, for example, by the computing system 105 of FIG. 2, and in particular by combined operations of challenge value generator 112 and verification manager 114 as executed by processor 110 in conjunction with the other components of the illustrated computing system.

The routine begins at block 205, in which a processor-based device receives a request for access to one or more network-accessible resources. In block 210, the processor-based device transmits a presentation policy indicating one or more credentials required for access. In block 215, the processor-based device receives information indicative of a commitment to a revocation handle, in accordance with an associated Sigma protocol.

In block 220, the processor-based device selects a challenge value from a challenge value set associated with the associated Sigma protocol, and provides that selected challenge value to the user. In block 225, the processor-based device receives from the user a presentation token and a distinct value parameter in accordance with the associated Sigma protocol.

In block 230, the processor-based device determines whether the presentation token and distinctive value parameter are valid according to the associated Sigma protocol. If so, in block 235 the processor-based device grants access to the requested resources. Otherwise, in block 240, the processor-based device takes one or more actions to prevent access to those requested resources.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that in some embodiments the functionality provided by the routine or routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that particular data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method to provide verification processes associated with a commitment-based authentication protocol comprising:

receiving, by one or more computing systems, a user request by a user for access to one or more network-accessible resources;

transmitting, by the one or more computing systems, a presentation policy to the user indicating one or more credentials required for the requested access;

receiving, by the one or more computing systems, a commitment to a revocation handle, wherein receiving the commitment includes receiving an indication of a Sigma protocol associated with distinct first, second, and third instruction sets, and wherein the received commitment includes information indicative of an output of the first instruction set;

providing, to the user by the one or more computing systems, a challenge value selected from a challenge value set associated with the indicated Sigma protocol;

receiving, from the user by the one or more computing systems and based at least in part on the selected challenge value and the indicated Sigma protocol, a presentation token and a value parameter that is distinct from the presentation token, wherein the value parameter is indicative of an output of the second instruction set;

determining, by the one or more computing systems and based at least in part on verifying an output of the third instruction set V, whether the presentation token and value parameter are valid in accordance with the indicated Sigma protocol; and granting access, by the one or more computing systems, for the user to the one or more network-accessible resources if it is determined that the presentation token and value parameter are valid in accordance with the indicated Sigma protocol, and otherwise preventing access to the one or more network-accessible resources by the user, wherein the computer-implemented method is performed with respect to a plurality of users that are each associated with a respective unique revocation handle, and wherein the computer-implemented method further comprise:

receiving information indicating use of a rogue credential that is intended to obtain access to the one or more network-accessible resources; and identifying the unique revocation handle associated with the rogue credential and preventing further access to the one or more network-accessible resources via use of the identified unique revocation handle.

2. The computer-implemented method of claim 1, wherein the request for access and the commitment to the revocation handle are provided in a single first electronic communication received from the user, and wherein the presentation policy and selected challenge value are provided to the user in a single second electronic communication.

3. The computer-implemented method of claim 1, wherein identifying the unique revocation handle associated with the rogue credential comprises identifying the unique revocation handle based at least in part on a second challenge value selected from the challenge value set.

4. The computer-implemented method of claim 1, wherein the rogue credential is provided by one or more of obfuscated software and a hardware device.

5. The computer-implemented method of claim 1, further comprises randomly selecting the challenge value from a value space associated with the Sigma protocol.

6. A non-transitory computer-readable medium having stored contents that, when executed by a processor, cause a computing system configured to provide verification processes associated with a commitment-based authentication protocol to perform steps comprising:

receiving, by the computing system, a user request by a user for access to one or more network-accessible resources;

transmitting, by the computing system, a presentation policy to the user indicating one or more credentials required for the requested access;

receiving, by the computing system, a commitment to a revocation handle, wherein receiving the commitment includes receiving an indication of a Sigma protocol executed by the user associated with distinct first, second and third instruction sets, and wherein the received commitment includes information indicative of an output of the first instruction;

providing, to the user by the computing system, a challenge value selected from a challenge value set associated with the indicated Sigma protocol;

receiving, from the user by the computing system and based at least in part on the selected challenge value and the indicated Sigma protocol, a presentation token and a value parameter that is distinct from the presentation token, wherein the value parameter is indicative of an output of the second instruction set; and granting access, by the computing system, for the user to the requested one or more network-accessible resources if it is determined that the presentation token and value parameter are valid in accordance with the indicated Sigma protocol, and otherwise preventing access to the requested one or more network-accessible resources by the user, wherein the steps are performed with respect to a plurality of users that are each associated with a respective unique revocation handle, and where the steps further comprises:

receiving information indicating use of a rogue credential that is intended to obtain access to the one or more network-accessible resources; and identifying the unique revocation handle associated with the rogue credential and preventing future access to the one or more network-accessible resources via use of identified unique revocation handle.

7. The non-transitory computer-readable medium of claim 6, wherein the request for access and the commitment to the revocation handle are provided in a single first electronic communication received from the user, and wherein the presentation policy and selected challenge value are provided to the user in a single second electronic communication.

8. The non-transitory computer-readable medium of claim 6, wherein identifying the unique revocation handle associated with the rogue credential is based at least in part on a second challenge value selected from the challenge value set.

9. The non-transitory computer-readable medium of claim 6, wherein the rogue credential is provided by one or more of obfuscated software and a hardware device.

10. The non-transitory computer-readable medium of claim 6, further comprises randomly selecting the challenge value from a value space associated with the Sigma protocol.

11. A system configured to provide verification processes associated with a commitment-based authentication protocol, the system comprising:
one or more processors; and
at least one memory, the memory including instructions that, upon execution by at least one of the one or more processors, cause the system to perform steps that includes:
receiving a user request by a user for access to one or more network-accessible resources;

transmitting a presentation policy to the user indicating one or more credentials required for the requested access;

receiving a commitment to a revocation handle, wherein receiving the commitment includes receiving an indication of Sigma protocol associated with the distinct first, second, and third instruction sets, and wherein the received commitment includes information indicative of an output of the first instruction;

providing to the user a challenge value selected from a challenge value set associated with the indicated Sigma protocol;

receiving, from the user by the system and based at least in part on the selected challenge value and the indicated Sigma protocol, a presentation token and a value parameter that is distinct from the presentation token, wherein the value parameter is indicative of an output of the second instruction set; and granting access, by the system, for the user to the requested one or more network-accessible resources if it is determined that the presentation token and value parameter are valid in accordance with the indicated Sigma protocol, and otherwise preventing access to the requested one or more network-accessible resources by the user, wherein the steps are performed with respect to a plurality of users that are each associated with a respective unique revocation handle, and wherein the steps further comprises:

receiving information indicating user of a rogue credential that is intended to obtain access to the one or more network-accessible resources; and identifying the unique revocation handle associated with the rogue credential and preventing further access to the one or more network-accessible resources via use of the identified unique revocation handle.

12. The system of claim 11, wherein the request for access and the commitment to the revocation handle are provided in a single first electronic communication received from the user, and wherein the presentation policy and selected challenge value are provided to the user in a single second electronic communication.

13. The system of claim 11, wherein identifying the unique revocation handle associated with the rogue credential is based at least in part on a second challenge value selected from the challenge value set.

14. The system of claim 11, wherein the rogue credential is provided by one or more of obfuscated software and a hardware device.

15. The system of claim 11, wherein selecting the challenge value from the challenge value set further comprises randomly selecting the challenge value from a value space associated with the Sigma protocol.

* * * * *